United States Patent [19]

Kosugi et al.

[11] Patent Number: 5,460,252

[45] Date of Patent: Oct. 24, 1995

[54] ONE-WAY ROTARY DAMPER

[75] Inventors: Akio Kosugi, Okazaki; Yoshio Shibanushi; Yoshiaki Nishiyama, both of Toyota, all of Japan

[73] Assignee: Illinois Tool Works Inc., Glenview, Ill.

[21] Appl. No.: 381,587

[22] Filed: Jan. 31, 1995

[30] Foreign Application Priority Data

Feb. 23, 1994 [JP] Japan .................................. 6-047969

[51] Int. Cl.$^6$ ................................................. F16D 57/02
[52] U.S. Cl. .................... 188/291; 188/296; 188/322.5; 192/12 BA; 16/85
[58] Field of Search .................... 188/290–292, 188/296, 322.5; 192/12 A, 12 B, 12 C, 12 BA; 16/52, 72, 82, 85

[56] References Cited

U.S. PATENT DOCUMENTS

| | | | |
|---|---|---|---|
| 4,527,675 | 7/1985 | Omata et al. | 188/322.5 |
| 4,550,470 | 11/1985 | Omata | 188/322.5 |
| 4,574,423 | 3/1986 | Ito et al. | 188/291 |
| 4,697,673 | 10/1987 | Omata | 188/291 |
| 4,836,151 | 5/1989 | Numata | 188/291 |
| 5,269,397 | 12/1993 | Kunamoto et al. | 188/322.5 |
| 5,311,877 | 1/1995 | Kobayashi | 188/290 |

Primary Examiner—Robert J. Oberleitner
Assistant Examiner—Chris Schwartz
Attorney, Agent, or Firm—Schwartz & Weinrieb

[57] ABSTRACT

A one-way rotary damper comprising a housing, a rotor consisting of a braking disk accommodated in a cavity of the housing and a shaft unitary with the braking disk and projecting toward the outside of the housing, viscous oil filling the housing cavity for applying shearing resistance against rotation of the rotor, a driven gear rotatably mounted upon the end of the rotor shaft projecting outside the housing so as to be free to rotate with respect thereto and formed on its surface facing the housing with a concentric depression consisting of a shallow circular depression and a deep outer annular groove surrounding the circular depression, a coupling disk which is identical in diameter with the circular depression and is fixed on the end of the rotor shaft projecting outside the housing so as to be disposed upon the circular depression, and a clutch spring disposed so as to extend along a radially outer surface of the coupling disk and a radially inner surface of the outer annular groove for enabling the driven gear to rotate freely when a torque is applied thereto in one direction and for rotating the rotor together with the driven gear when a torque is applied thereto in the other direction.

10 Claims, 2 Drawing Sheets

ONE-WAY ROTARY DAMPER

FIELD OF THE INVENTION

This invention relates to a one-way rotary damper, and more particularly to an oil-type one-way rotary damper used in conjunction with an ash tray, coin tray or other such drawer-like compartment installed, for example, in the passenger compartment of a vehicle for retarding the movement of the compartment as it is being moved toward its opened or use position, for reducing the noise of the compartment when it is projected into the openeds or uses position by the force of a spring, and for freeing it of the retarding force when it is returned to its retracted position by hand.

DESCRIPTION OF THE PRIOR ART

U.S. Pat. No. 4,697,673 teaches an oil-type one-way rotary damper of the aforenoted general type. The one-way rotary damper disclosed in this patent comprises a housing having a flat cylindrical internal cavity, a rotor consisting of a braking disk having a plurality of radial blades accommodated in the cavity of the housing and a shaft unitary with the axial center portion of the braking disk and projecting toward the outside of the housing through the upper wall thereof, viscous oil filling the housing cavity for applying shearing resistance against rotation of the rotor braking disk, a driven gear rotatably fitted on the end of the rotor shaft projecting outside the housing so as to be free to rotate with respect thereto, and a clutch spring provided between the driven gear and the rotor shaft for enabling the driven gear to rotate freely when a torque is applied thereto in one direction and for gripping the rotor shaft and causing the rotor to rotate together with the driven gear when a torque is applied thereto in the other direction.

In this prior art damper, the clutch spring is wound upon the exterior of the rotor shaft and is provided at its upper end with a projection extending tangentially for engagement with the driven gear. The driven gear therefore has to be provided not only with a center hole for receiving the rotor shaft having the clutch spring wound thereon but also with a blind receptacle communicating with the center hole for accommodating the projection at the upper end of the spring. This makes the shape of the mold for producing the driven gear complicated and increases the manufacturing cost there-of. Over a long period of use, moreover, the projection is liable to break due to the stress repeatedly occurring therein first in one direction and then in the other. Another drawback of this patented damper is that the clutch spring can grip the rotor shaft with only a weak force when it is tightened by the torque applied by the driven gear. This is because the rotor shaft has to be made relatively thin so as to ensure that the O-ring fitted thereon for preventing leakage of the viscous oil through the upper wall of the housing can provide a good sealing effect. While the gripping force can be increased by increasing the axial length of the clutch spring, this is not an acceptable solution because it also increases the axial length of the one-way rotary damper and thus runs counter to the desire to minimize damper size.

OBJECTS OF THE INVENTION

One object of this invention is to provide a compact one-way rotary damper capable of producing a strong damping effect.

Another object of the invention is to provide a durable one-way rotary damper capable of stably producing a damping effect over long periods of time without breakage of its clutch spring.

SUMMARY OF THE INVENTION

For achieving the aforenoted objects, this invention provides a one-way rotary damper comprising a housing having a flat cylindrical internal cavity, a rotor consisting of a braking disk having a plurality of radial blades accommodated in the cavity of the housing and a shaft unitary with the axial center portion of the braking disk and projecting toward the outside of the housing through the upper wall thereof, viscous oil filling the housing cavity for applying shearing resistance against rotation of the rotor braking disk, a driven gear rotatably fitted upon the end of the rotor shaft projecting outside the housing so as to be free to rotate with respect thereto and formed on its surface facing the housing with a concentric depression consisting of a shallow circular depression and a deep outer annular groove surrounding the circular depression, a coupling disk which is identical in diameter with the circular depression and is fixed on the end of the rotor shaft projecting outside the housing so as to fit onto that portion of the driven gear defining the circular depression, and a clutch spring disposed so as to extend along the radially outer surface of the coupling disk and the radially inner surface of the outer annular groove for enabling the driven gear to rotate freely when a torque is applied thereto in one direction and for gripping the outer surface of the coupling disk so as to rotate the rotor together with the driven gear when a torque is applied thereto in the other direction.

Thus, in the rotary damper according to this invention, the coupling disk is fixed on the end of the rotor shaft projecting outside the housing so as to rotate unitarily with the rotor and is fitted upon that portion of the driven gear which defines the circular depression formed in the bottom surface of the driven gear, and the clutch spring is disposed so as to extend along the outer surface of the coupling disk and the inner surface of the outer annular groove surrounding the concentric depression. The diameter of the clutch spring is therefore considerably larger than the diameter of the rotor shaft. Since a strong damping effect can therefore be obtained with a spring having a small number of windings, the one-way rotary damper can be realized in a compact size. In addition, since the clutch spring does not have a tangentially extending projection, the probability of the spring breaking is extremely low.

BRIEF DESCRIPTION OF THE DRAWINGS

The above and other objects, characteristic features and advantages of this invention will become apparent to those skilled in the art from the description of the invention given hereinbelow with reference to the accompanying drawings, in which like reference characters designate like or corresponding parts throughout the several views, and wherein:

FIG. 5 is a plan view of the one-way rotary damper of

FIG. 4.

DESCRIPTION OF THE PREFERRED EMBODIMENTS

Figure 1:
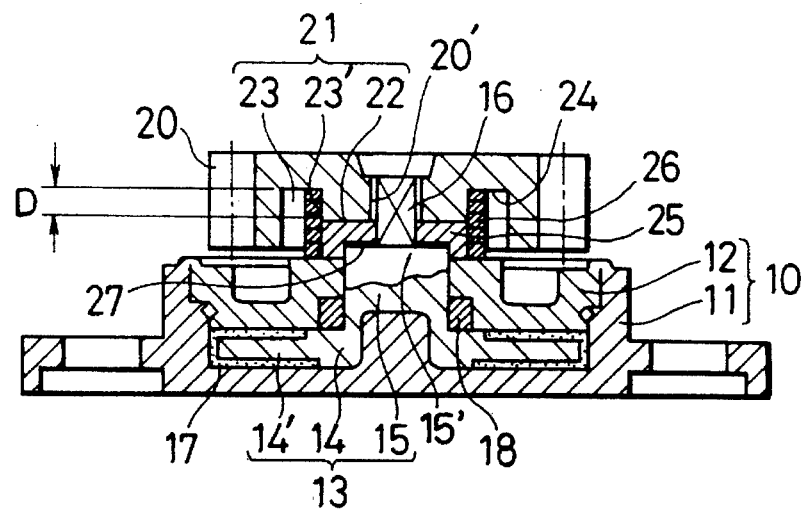
FIG. 1 is a side view, partially in section, of a one-way rotary damper that is an embodiment of this invention.
Figure 2:
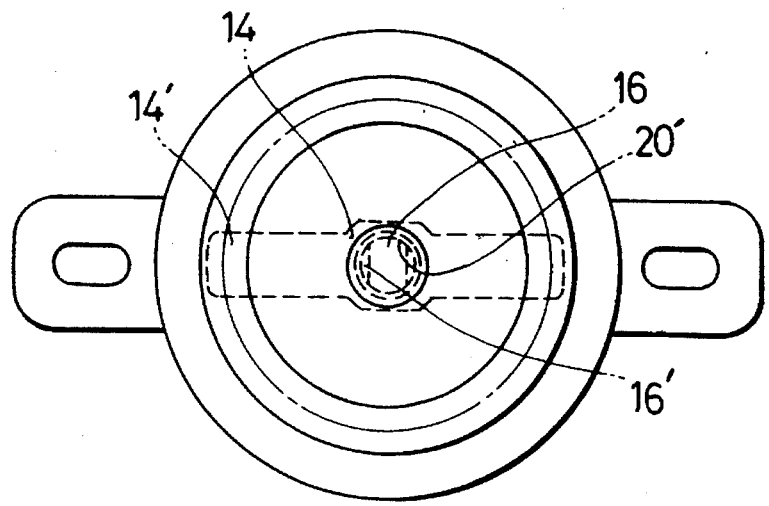
FIG. 2 is a plan view of the one-way rotary damper of FIG. 1.
Figure 3:
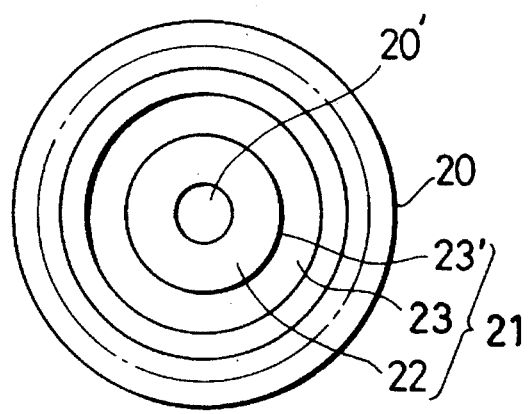
FIG. 3 is a bottom view of the one-way rotary damper of FIG. 1.

FIGS. 1 to 3 show an embodiment of a one-way rotary damper according to this invention. The one-way rotary damper comprises a housing 10 formed by a dish-like main body 11 and an upper wall 12 such that together they define a flat cylindrical internal cavity, a rotor 13 consisting of a braking disk 14 having a number (two or four, for example) of radial blades 14' accommodated in the cavity of the housing 10 and a shaft 15 unitary with the axial center portion of the braking disk 14 and projecting toward the outside of the housing through a center hole in the upper wall 12 thereof, and viscous oil 17 filling the housing cavity accommodating the rotor braking disk 14. An O-ring 18 is fitted about the rotor shaft 15 for preventing leakage of the viscous oil 17 to the outside through the center hole of the upper wall 12. The portion of the rotor shaft 15 projecting outside the upper wall 12, that is projecting portion 16, is formed so as to have a polygonal, oval, D-like or other non-circular sectional shape.

A driven gear 20 is formed with a circular center hole 20' by which it is fitted on the projecting portion 16 of the rotor shaft 15, and is further formed on its surface facing the upper wall 12 of the housing 10 with a concentric depression 21 consisting of a shallow circular depression 22 and a deep outer annular groove 23. The radially inner surface 23' of the outer annular groove 23 extends downwardly from the floor 24 of the outer annular groove 23 in the manner of a cylinder through means of a distance D equal to the difference between the depths of the outer annular groove 23 and the circular depression 22.

A coupling disk 25 formed with a non-circular center hole of a shape identical with the sectional shape of the projecting portion 16 of the rotor shaft 13 is fitted on the projecting portion 16 of the rotor shaft so as to be rotatable integrally therewith. The coupling disk 25 has the same diameter as the circular depression 22 and is mounted upon it from below. A coil spring serving as a clutch spring 26 is disposed so as to extend along the radially outer surface of the coupling disk 25 and the radially inner surface 23' of the outer annular groove 23. It is formed so as to have an inner diameter that is slightly smaller than that of the cylinder defined by these two surfaces.

The dish-like main body 11, the upper wall 12, the rotor 13, the driven gear 20, and the coupling disk 25 are plastic moldings. Only the clutch spring 26 is made of metal spring wire.

The one-way rotary damper is assembled from the aforenoted components by inserting the braking disk 14 into the dish-like main body 11, filling the remaining space in the dish-like main body 11 with the viscous oil 17, fitting the O-ring 18 about the rotor shaft 15, engaging the center hole of the upper wall 12 of the housing 11 with the upper end of the rotor shaft 15 and drawing the upper wall 12 downwardly along the rotor shaft 15 so as to close the dish-like main body 11 from above, and joining the upper wall 12 and the dish-like main body 11 by high-frequency welding. The remainder of the assembly is carried out, for example, by placing the coupling disk 25 on the circular depression 22 of the driven gear 20, expanding the inner diameter of the clutch spring 26 and fitting it over the inner surface 23' of the outer annular groove 23 and the outer surface the coupling disk 25, fitting the center hole of the coupling disk 25 and the center hole 20' of the driven gear 20 onto the projecting portion 16 of the rotor shaft 15 extending away from the exterior of the upper wall 12 of the housing 10, and caulking the portion of the projecting portion 16 of the rotor shaft 15 projecting externally of the driven gear 20 by use of high-frequency welding so as to prevent the driven gear 20, coupling disk 25 and clutch spring 26 from coming off the rotor shaft 15. Although a metal spring wire having a round sectional shape can be used for making the clutch spring 26, it is preferable to use wire having a square sectional shape because this makes it possible to increase the contact area with the outer surface of the coupling disk 25 and the inner surface of the outer annular groove 23, leading to a reduction in the axial length of the damper.

When the driven gear 20 of the one-way rotary damper, assembled in this manner, is rotated in the direction tending to reduce the diameter of the clutch spring 26, the clutch spring 26 grips the outer surface of the coupling disk 25 and rotates both it and the rotor shaft 15, to which it is rotatably fixed in the same direction. Since the rotation of the rotary shaft 15 can be achieved only by overcoming the shearing resistance applied to the braking disk 14 by the viscous oil 17, the torque applied to driven gear 20 is damped. When the driven gear 20 is rotated in the opposite direction, the clutch spring 26 is loosened so that rotor shaft 15 is not rotated and only the driven gear 20 and the clutch spring 26 rotate freely relative to the outer surface of the coupling disk 25.

In the embodiment shown in FIGS. 1 to 3, the projecting portion 16 of the rotor shaft 15 is formed so as to have a non-circular sectional shape, that is, the oval shape shown in FIG. 2, for example, so as over its entire length. As a result, gaps 16' are present between the center hole 20' of the driven gear 20 and the outer surface of the projecting portion 16.

Figure 4:
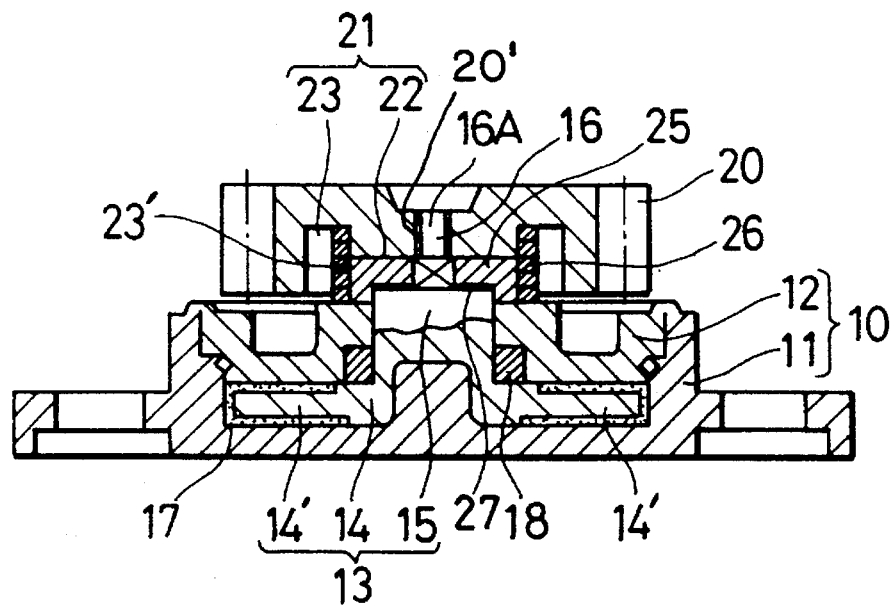
FIG. 4 is a side view, partially in section, of a one-way rotary damper that is another embodiment of this invention.
Figure 5:
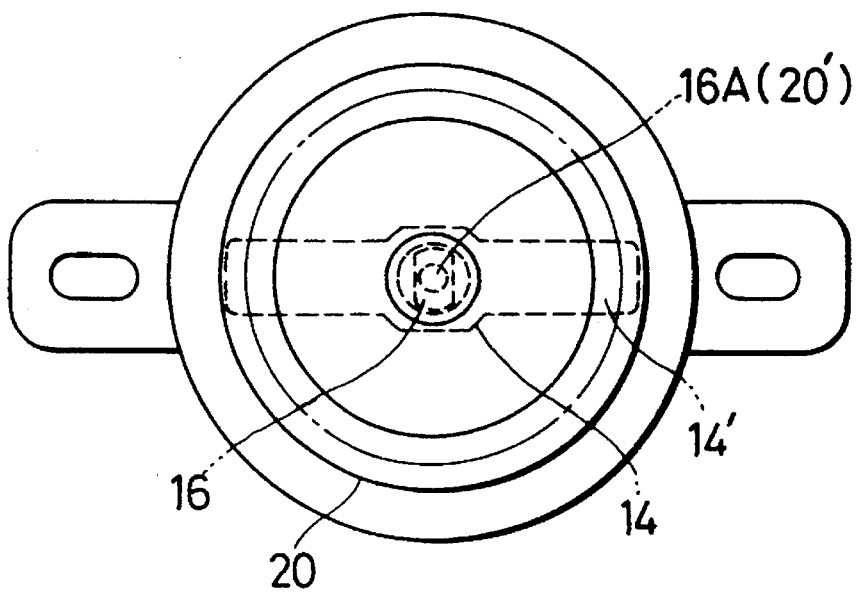

In applications where these gaps 16' are undesirable, they can be eliminated by, as shown in FIGS. 4 and 5, making the diameter of the center hole 20' of the driven gear 20 smaller, and forming the upper end portion 16A of the projecting portion 16, that is, the upper end portion projecting above the coupling disk 25 and passing through the center hole 20' of the driven gear 20, so as to have a smaller curvature than the lower portion thereof and to have a sectional diameter equal to the diameter of the center hole 20' of the driven gear 20.

In addition, the length of the damper in the axial direction can be further reduced by, as indicated in FIG. 1, forming a concentric circular depression 27 in the bottom surface of the coupling disk 25 and fitting it over a thick base portion 15' of the rotor shaft 15 projecting above the upper wall 12 of the housing 10. This configuration is also advantageous in that it facilitates the damper assembly by maintaining the axial alignment of the rotor shaft 15 and the coupling disk 25, and that it ensures smooth rotation during use.

As explained in the foregoing, the coupling disk 25 is fixed upon the end of the rotor shaft 15 projecting outside the housing 10 and is disposed upon the circular depression 22 constituting part of the concentric depression 21 of the driven gear 20, and the clutch spring 26 is disposed so as to extend along the outer surface of the coupling disk 25 and the inner surface 23' of the outer annular groove 23 of the concentric depression 21. Since the O-ring 18 for preventing leakage of the viscous oil 17 from the housing 10 can therefore be fitted about a small diameter portion of the rotor shaft 15, the excellent sealing effect of the prior art damper can be maintained, while, in addition, the disposition of the clutch spring 26 so as to extend along the outer surface of the coupling disk 25, which has a considerably larger diameter than the rotor shaft 15, and the inner surface 23' of the outer annular groove 23 makes it possible to obtain a strong gripping force and damping effect with a clutch spring having a small number of windings and this in turn makes it possible to reduce the size of the damper.

The upper half of the clutch spring 26 is wound about the inner surface 23' of the annular groove 23 and the lower half thereof about the outer surface of the coupling disk 25, and since the clutch spring 26 has no tangential projection, it is not susceptible to breakage. The damper is therefore ensured of a long service life.

Obviously, many modifications and variations of the present invention are possible in light of the above teachings. It is therefore to be understood that within the scope of the appended claims, the present invention may be practiced otherwise than as specifically described herein.

What is claimed is:

1. A one-way rotary damper, comprising:

a housing having a substantially flat, cylindrical internal cavity defined by means of a bottom wall, a peripheral side wall, and an upper wall;

a rotor comprising a braking disk having a plurality of radial blades disposed within said cavity of said housing, and a shaft unitary with said baking disk and projection upwardly toward the outside of said housing through said upper wall thereof;

viscous oil filling said housing cavity for applying shearing resistance against rotation of said rotor braking disk;

a driven gear rotatably mounted upon an end portion of said rotor shaft projecting outwardly from said housing so as to be free to rotate with respect to said end portion of said rotor shaft, and provided with a circular depression and an annular groove surrounding said circular depression;

a coupling disk identical in diameter with said circular depression and mounted upon said end portion of said rotor shaft projecting outwardly from said housing so as to rotatably seat said circular depression of said driven gear; and a clutch spring disposed within said annular groove of said driven gear and annularly surrounding said coupling disk and said circular depression of said driven gear so as to extend along the radially outer surfaces of said coupling disk and said circular depression, and along the radially inner surface of said annular groove, for enabling said driven gear to freely rotate when a torque is applied thereto in a first direction, and for gripping said outer surface of said coupling disk so as to rotate said rotor together with said driven gear when a torque is applied said driven gear in a second opposite direction.

2. A one-way rotary damper according to claim 1, wherein:

said rotor comprises a shouldered base portion; and said coupling disk has a circular depression formed within its bottom surface for receiving said shouldered base portion of said rotor such that said rotor and said coupling disk are concentrically rotatably aligned with respect to each other.

3. A one-way rotary damper as set forth in claim 1, wherein:

said rotor comprises a pair of diametrically opposed blades.

4. A one-way rotary damper as set forth in claim 1, further comprising:

O-ring means disposed about said rotor shaft and interposed between said rotor shaft and said upper wall of said housing for preventing leakage of said viscous oil out from said housing cavity.

5. A one-way rotary damper as set forth in claim 1, wherein:

said rotor shaft comprises a non-circular cross-sectional portion for engaging a similarly configured non-circular annular wall portion of said coupling disk whereby said coupling disk is rotatably fixed with respect to said rotor shaft.

6. A one-way rotary damper as set forth in claim 1, wherein;

the inner diameter of said clutch spring is normally less than the outer diameter of said coupling disk and said circular depression of said driven gear such that said clutch spring must be radially expanded in order to mount said clutch spring about said coupling disk and circular depression of said driven gear.

7. A one-way rotary damper as set forth in claim 1, wherein;

said housing, said rotor, said driven gear, and said coupling disk comprise plastic moldings; and said clutch spring comprises metal spring wire.

8. A one-way rotary damper as set forth in claim 7, wherein:

said metal spring wire comprising said clutch spring has a substantially square cross-sectional configuration.

9. A one-way rotary damper as set forth in claim 1, wherein:

said housing comprises means for fixedly mounting said rotary damper upon a support surface such that said rotary damper can dampen the movement of a drawer-type closure.

10. A one-way rotary damper as set forth in claim 9, wherein:

said drawer-type closure is one of a vehicle ash tray and coin tray.

* * * * *